(12) United States Patent
Okamura et al.

(10) Patent No.: US 9,618,713 B2
(45) Date of Patent: Apr. 11, 2017

(54) OPTICAL ELEMENT

(71) Applicant: Sumitomo Osaka Cement Co., Ltd., Chiyoda-ku, Tokyo (JP)

(72) Inventors: Miki Okamura, Tokyo (JP); Tokutaka Hara, Tokyo (JP)

(73) Assignee: Sumitomo Osaka Cement Co., Ltd., Chiyoda-ku, Tokyo (JP)

(*) Notice: Subject to any disclaimer, the term of this patent is extended or adjusted under 35 U.S.C. 154(b) by 6 days.

(21) Appl. No.: 14/764,714

(22) PCT Filed: Jan. 21, 2014

(86) PCT No.: PCT/JP2014/051117
§ 371 (c)(1),
(2) Date: Jul. 30, 2015

(87) PCT Pub. No.: WO2014/119427
PCT Pub. Date: Aug. 7, 2014

(65) Prior Publication Data
US 2015/0362687 A1 Dec. 17, 2015

(30) Foreign Application Priority Data
Jan. 31, 2013 (JP) ................. 2013-017674

(51) Int. Cl.
*G02B 6/42* (2006.01)
*G02B 6/30* (2006.01)
(Continued)

(52) U.S. Cl.
CPC ......... *G02B 6/4266* (2013.01); *G02B 6/2706* (2013.01); *G02B 6/30* (2013.01);
(Continued)

(58) Field of Classification Search
CPC .......... G02B 6/30; G02B 6/32; G02B 6/2706; G02B 6/4266; G02B 2006/12142;
(Continued)

(56) References Cited

U.S. PATENT DOCUMENTS 5,898,805 A 4/1999 Kanazawa et al.
5,963,357 A 10/1999 Kubota et al.
(Continued)

FOREIGN PATENT DOCUMENTS

JP H09-211277 A 8/1997
JP H10-221664 A 8/1998
(Continued)

OTHER PUBLICATIONS

International Search Report (PCT Article 18 and Rule 43 and 44), International Application No. PCT/JP2014/051117, Mar. 25, 2014.
(Continued)

*Primary Examiner* — John M Bedtelyon
(74) *Attorney, Agent, or Firm* — Taft Stettinius & Hollister LLP (57) ABSTRACT

An aspect of the present invention is an optical element that combines light waves using a spatial optical system, including a housing section, an optical waveguide element, a combine section, and a collimator section is provided. The housing section has a storage space and is formed by joining two or more members together. The optical waveguide element is provided in the storage space and emits at least two light waves. The combine section is provided outside the storage space and combines the light waves emitted from the optical waveguide element outside the housing section using a spatial optical system. The collimator section is connected to the housing section, holds the combine section, and includes a light focusing section configured to focus a light wave combined by the combine section and an optical (Continued)

fiber to which the light wave focused by the light focusing section is introduced.

6 Claims, 5 Drawing Sheets

(51) Int. Cl.
  *G02B 6/32* (2006.01)
  *G02B 6/27* (2006.01)
  *G02F 1/035* (2006.01)
  *G02F 1/03* (2006.01)
  *G02F 1/225* (2006.01)
  *G02F 1/01* (2006.01)
  *G02F 1/21* (2006.01)
(52) U.S. Cl.
  CPC ............... *G02B 6/32* (2013.01); *G02F 1/035* (2013.01); *G02F 1/0311* (2013.01); *G02F 1/225* (2013.01); *G02F 1/0136* (2013.01); *G02F 2001/212* (2013.01)
(58) Field of Classification Search
  CPC  G02B 2006/12159; G02B 6/126; G02B 6/27; G02B 6/272; G02B 6/2766; G02B 6/2773; G02B 6/4201; G02B 6/4203; G02B 6/4204; G02B 6/4206; G02B 6/4213; G02B 6/4256; G02B 6/4262; G02F 1/0311; G02F 1/035; G02F 1/225; G02F 1/0136; G02F 2001/212; G02F 1/0353
  See application file for complete search history.

(56) References Cited

U.S. PATENT DOCUMENTS

| | | | | |
|---|---|---|---|---|
| 8,570,644 | B2* | 10/2013 | Oguri | .................... G02B 6/126 |
| | | | | 359/237 |
| 2011/0255147 | A1* | 10/2011 | Oguri | .................... G02B 6/126 |
| | | | | 359/303 |

FOREIGN PATENT DOCUMENTS

| | | | |
|---|---|---|---|
| JP | 2010-156842 | A | 7/2010 |
| JP | 2010-237366 | A | 10/2010 |
| JP | 2012-047953 | A | 3/2012 |
| JP | 2012-118282 | A | 6/2012 |
| JP | 2012-203282 | A | 10/2012 |
| JP | 2012-211971 | | 11/2012 |

OTHER PUBLICATIONS

Notification of Transmittal of Translation of the International Preliminary Report on Patentability(Chapter I or Chapter II), International Application No. PCT/JP2014/051117, Aug. 13, 2015, with attachments.

Notice of Allowance in JP Patent Application P2013-017674, dated Nov. 11, 2014, Japan Patent Office, Tokyo, Japan.

* cited by examiner

OPTICAL ELEMENT

TECHNICAL FIELD

The present invention relates to an optical element that combines light waves using a spatial optical system.

BACKGROUND ART

In recent years, as an optical element that enables high-speed (100 Gbps or the like) and high-capacity communication, dual polarization-quadrature phase shift keying (DP-QPSK) described in Patent Literature No. 1 has been put into practical use. The above-described optical element includes a substrate on which two QPSK modulation units (having a waveguide structure called a nested structure) are formed in parallel, a light focusing element, a polarization combine element (Patent Literature Nos. 2 and 3), and the like. In addition, the above-described optical components are disposed in a housing section formed of a metal such as stainless steel. The housing section is made up of a box portion and a lid portion that covers the box portion and is air-tightly sealed.

CITATION LIST

Patent Literature

[Patent Literature No. 1] Japanese Laid-open Patent Publication No. 2010-156842
[Patent Literature No. 2] Japanese Laid-open Patent Publication No. 2012-211971
[Patent Literature No. 3] Japanese Laid-open Patent Publication No. 2012-047953

SUMMARY OF INVENTION

Technical Problem

In a case in which the housing section that stores the optical components is air-tightly sealed, generally, seam welding which is a type of electric resistance welding is used. In seam welding, joule heat which is generated near a portion being welded due to the electric conduction of the portion being welded using roller electrodes is used. During the seam welding, locally-generated joule heat creates a temperature distribution, the accompanying heat shrinkage warps the housing section of the optical element, and the adjusted positions of the optical components such as the substrate, the light-focusing element, and the polarization combine element disposed in the housing in advance are misaligned, which creates a concern that the characteristics may deteriorate. In addition, there is another concern that the same problem may be caused due to a temperature change in the ambient environment of the optical element.

Therefore, an object of the present invention is to provide an optical element of which the characteristics do not deteriorate even in a case in which the temperature changes.

Solution to Problem

According to an aspect of an optical element of the present invention, there is provided an optical element that combines light waves using a spatial optical system, including a housing section, an optical waveguide element, a combine section, and a collimator section. The housing section has a storage space therein and is formed by joining two or more members together. The optical waveguide element is provided in the storage space and emits at least two light waves. The combine section is provided outside the storage space and combines the light waves emitted from the optical waveguide element outside the housing section using a spatial optical system. The collimator section is connected to the housing section, holds the combine section, and includes light focusing section configured to focus a light wave combined by the combine section and an optical fiber to which the light wave focused by the light focusing section is introduced.

In the optical element, the optical waveguide element is provided in the storage space of the housing section and the combine section is disposed outside of the storage space. Therefore, it becomes possible to attach the combine section after two or more members configuring the housing section are joined together. Therefore, even in a case in which the members of the housing section are joined together using a method in which heat generated from seam welding is used, the combine section is combined after the members are joined together and thus there is no case in which the position misalignment of the combine section is caused due to the influence of heat generated during the joining of the members. In addition, since the combine section is provided outside of the storage space of the housing section in this configuration, it is possible to decrease the size of the housing section as much as the space of the combine section and the space required for attaching the combine section. Therefore, an increase in the length of the housing section is prevented and, even in a case in which heat is added to the housing section, the warping of the housing section can be suppressed. As described above, in the optical element, there are no cases in which the characteristics deteriorate even when the temperature changes.

In addition, in the optical element, it becomes possible to closely dispose the combine section and the collimator section along the same axis outside of the storage space of the housing section. Therefore, compared with a case in which the combine section is disposed in the storage space of the housing section and the collimator section is disposed outside of the storage space of the housing section, in the optical element, even in a case in which the temperature changes, it is possible to suppress the positions of the combine section and the collimator section being misaligned and to prevent the degradation of the characteristics.

The combine section is capable of including a polarization rotation element that rotates a polarization plane of at least one of the light waves emitted from the optical waveguide element and a polarization combine element that polarization-combines, from among the light waves emitted from the optical waveguide element, a light wave having a polarization plane not rotated by the polarization rotation element and a light wave having a polarization plane rotated by the polarization rotation element, or light waves having polarization planes rotated by the polarization rotation element.

In this case, the polarization rotation element and the polarization combine element are disposed outside of the storage space of the housing section and it becomes possible to further decrease the size of the housing section. In addition, since it becomes possible to further decrease the size of the housing section, even in a case in which the temperature changes, the warping of the housing section is further suppressed and the degradation of the characteristics can be suppressed.

The optical element is capable of further including a polarization rotation element that rotates a polarization plane of at least one of the light waves emitted from the optical waveguide element. In this case, the combine section polarization-combines, from among the light waves emitted from the optical waveguide element, a light wave having a polarization plane not rotated by the polarization rotation element and a light wave having a polarization plane rotated by the polarization rotation element, or light waves having polarization planes rotated by the polarization rotation element.

Therefore, since it is possible to hold the combine section using the collimator section and to dispose the polarization rotation element at an appropriate position, the degree of freedom for design improves.

It is preferable that the collimator section further includes a spacer section having at least two contact surfaces with which the combine section is brought into contact and the combine section is fixed to the contact surfaces of the spacer section. In this case, when the combine section is fixed to the contact surfaces of the spacer section with an adhesive, it becomes possible to ensure a wide adhesion area and it is possible to increase the adhesion strength. Therefore, it is possible to prevent the position misalignment and dropping of the combine section.

It is preferable that the collimator section further includes a restraining member that restrains a position misalignment of the combine section with respect to the contact surfaces of the spacer section. In this case, it is possible to more reliably fix the combine section to the spacer section using the restraining member.

The restraining member is preferably a leaf spring or a filler. In this case, the combine section can be easily and reliably fixed to the spacer section using the leaf spring or the filler.

It is preferable that the collimator section includes a first collimator section to which the combine section and the light focusing section are fixed and a second collimator section to which the optical fiber is fixed. In this case, it becomes possible to more accurately introduce the light waves focused by the light focusing section into the optical fiber by adjusting the positional relationship between the first collimator section and the second collimator section.

Advantageous Effects of Invention

According to the aspect of the present invention, there are no cases in which characteristics deteriorate even when the temperature changes.

BRIEF DESCRIPTION OF DRAWINGS

FIG. 3 illustrates cross-sectional views of the optical modulator in FIG. 1 in which FIG. 3(a) is a cross-sectional view in the direction of line IIIa-IIIa in FIG. 1 and FIG. 3(b) is a cross-sectional view in the direction of line IIIb-IIIb in FIG. 1.

DESCRIPTION OF EMBODIMENTS

Hereinafter, an embodiment of the present invention will be described using a DP-QPSK modulator as an example with reference to the accompanying drawings.

Figure 1:
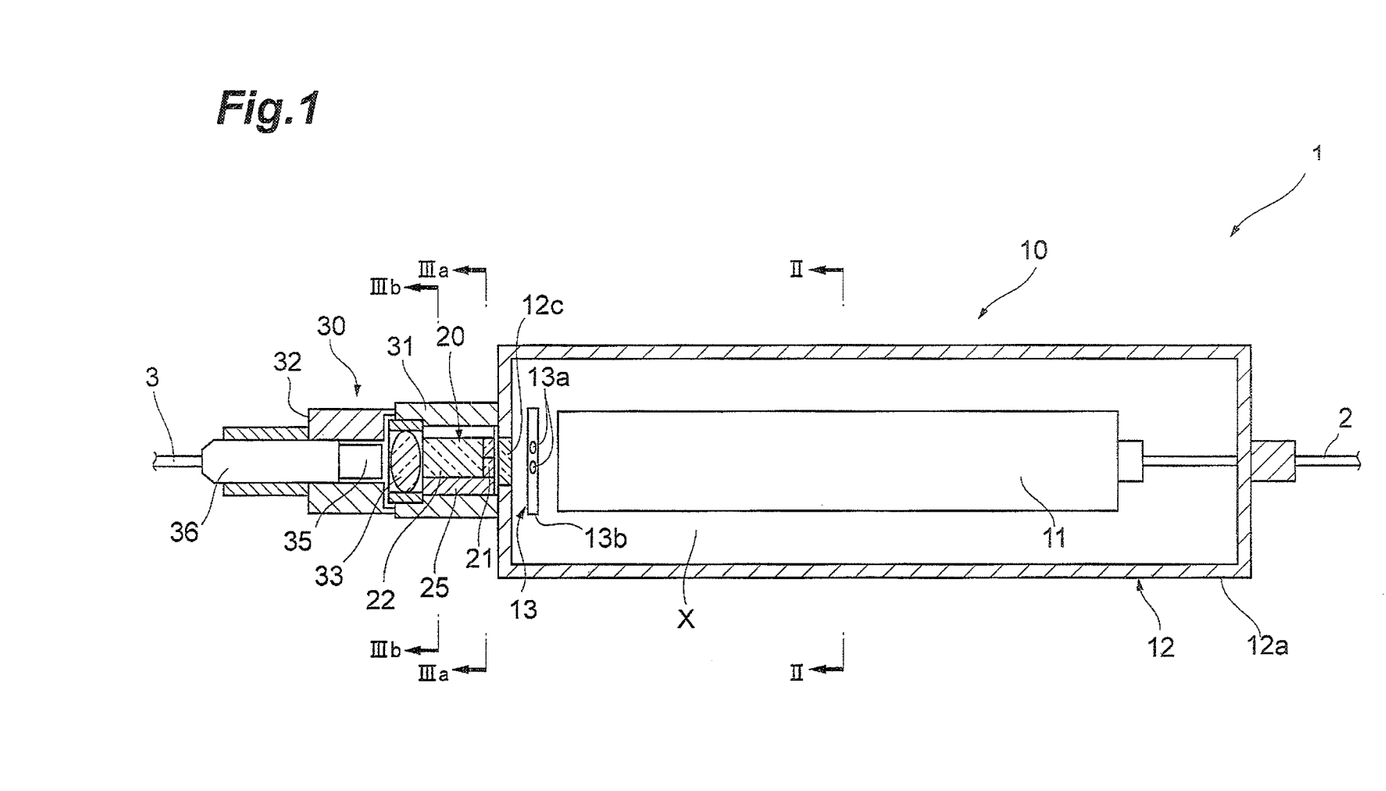
FIG. 1 is a cross-sectional view of an optical modulator according to an embodiment illustrating the outline of the inside configuration thereof.

As illustrated in FIG. 1, an optical modulator (optical element) 1 includes a modulation unit 10, a combine section 20, and a collimator section 30. The modulation unit 10 outputs two light waves. Specifically, the modulation unit 10 includes a substrate (optical waveguide element) 11, a housing section 12, and a lens section 13. A light wave is input to the substrate 11 through an optical fiber 2. The substrate 11 is, for example, formed of a material having an electro-optic effect such as lithium niobate ($LiNbO_3$). The substrate 11 modulates the light wave input from the optical fiber 2. On the substrate 11, for example, a waveguide structure in which two QPSK modulation units having an optical waveguide structure that is called a nested structure in which two Mach-Zehnder (hereinafter, expressed as "MZ") optical waveguides are disposed in parallel and the respective MZ optical waveguides are embedded in a branch waveguide of a larger MZ optical waveguide are disposed in parallel is formed. When a driving signal is added to a modulation electrode formed on the substrate 11, two modulated and multiplexed light waves are emitted from the substrate 11. The configuration of the substrate 11 is not limited to a configuration in which two QPSK modulation units having a nested structure are formed in parallel and may be any configuration as long as two or more light waves are emitted. For example, a BPSK modulation unit which carries out binary modulation and includes one MZ optical waveguide may be employed or a modulation unit which carries out multilevel (binary or more) modulation may be employed.

The lens section 13 collimates the two light waves emitted from the substrate 11 and emits the light waves toward the combine section 20. In more detail, two lens portions 13a that respectively collimate the two light waves emitted from the substrate 11 are provided in a holding substrate 13b of the lens section 13. However, it is also possible to provide the lens portion 13a that collimates one of the two light waves emitted from the substrate 11 and the lens portion 13a that collimates the other light wave on separate substrates.

Figure 2:
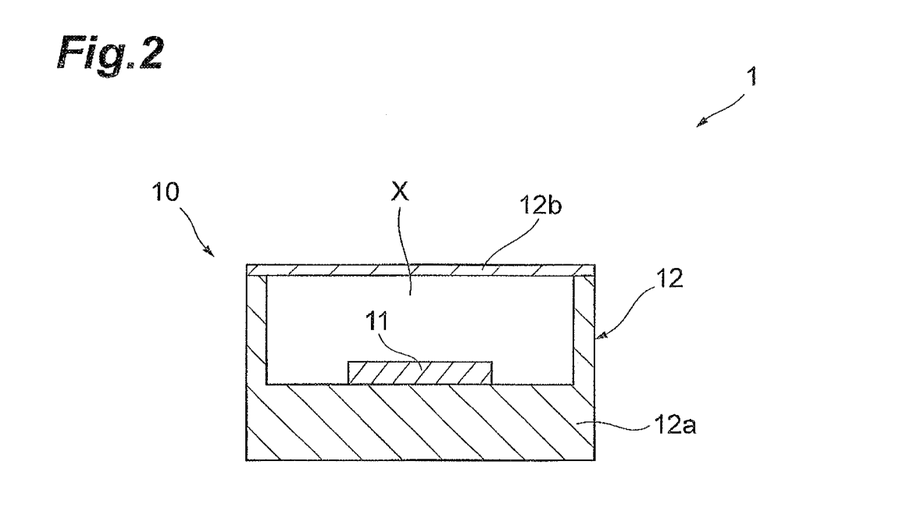
FIG. 2 is a cross-section view in the direction of line II-II in FIG. 1.
Figure 3:
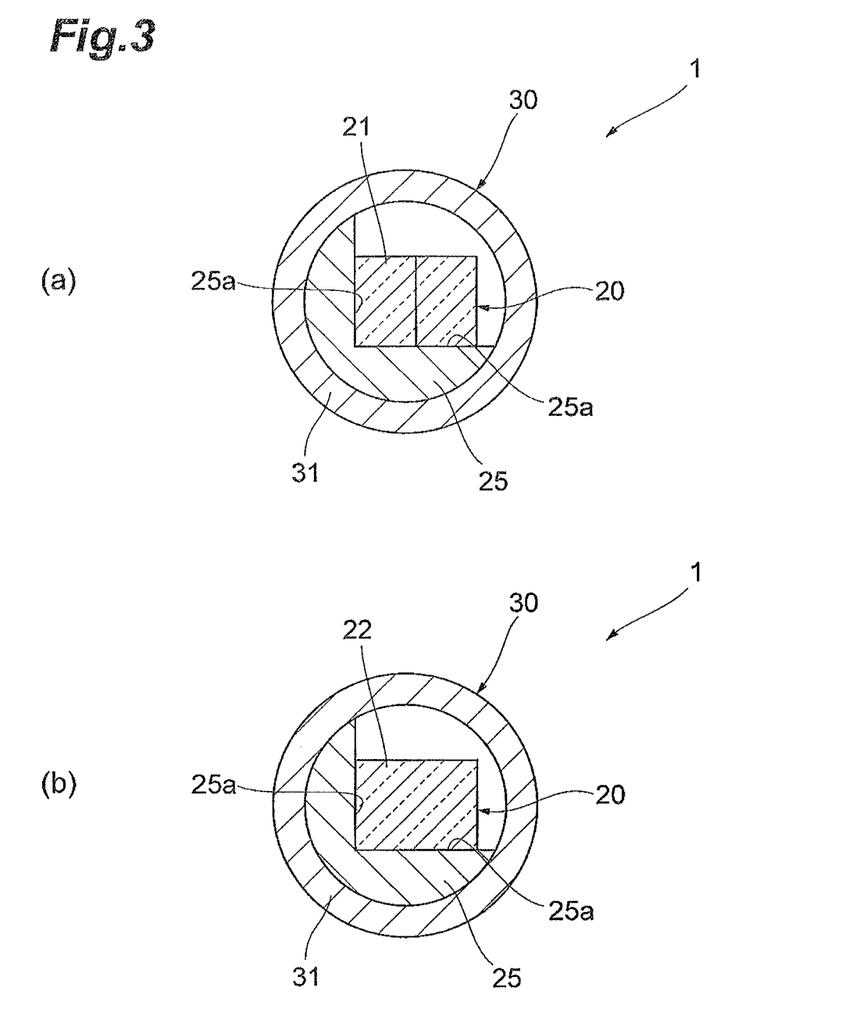

The housing section 12 includes a storage space X therein. The substrate 11 and the lens section 13 are provided in the storage space X of the housing section 12. As illustrated in FIG. 2, the housing section 12 includes a box portion (member) 12a and a lid portion (member) 12b. The box portion 12a has a cuboid box shape with one open surface. The lid portion 12b is disposed so as to cover the open portion of the box portion 12a. The box portion 12a is air-tightly sealed with the lid portion 12b. As a material for the box portion 12a and the lid portion 12b, for example, it is possible to use a metal such as stainless steel. The box portion 12a and the lid portion 12b are joined together using a method in which heat generated from seam welding is used. While the housing section 12 formed of the box portion 12a and the lid portion 12b has been described, the housing section 12 may also be formed by joining two or more members together through seam welding or the like.

In addition, in the box portion 12a, a window 12c for guiding the light waves emitted from the substrate 11 outside of the housing section 12 is provided. As a material for the window 12c, for example, sapphire can be used. The substrate 11 is fixed to the box portion 12a using, for example, an adhesive or the like. Meanwhile, it is also possible to make a portion with which the substrate 11 is brought into contact thicker than any other portion on a surface to which the substrate 11 is fixed and fix the substrate onto the portion having a greater thickness so as to be formed into a table shape.

As illustrated in FIGS. 1 to 3(a) and 3(b), the combine section 20 includes a polarization rotation element 21 and a polarization combine element 22. The polarization rotation element 21 rotates the polarization planes of the two light waves emitted from the substrate 11 and puts the two light waves into a state in which the polarization planes thereof are inclined to each other at 90 degrees. The polarization rotation element 21 may rotate the polarization plane of one of the two light waves emitted from the substrate 11 by 90 degrees or may rotate the polarization plane of one of the two light waves by 45 degrees and rotate the polarization plane of the other light wave by 45 degrees.

The polarization combine element 22 polarization-combines the two light waves the polarization planes of which are inclined to each other at 90 degrees by the polarization rotation element 21 together using a spatial optical system and emits the two light waves to the same light path. As the polarization combine element 22, for example, yttrium•vanadate crystals can be used.

The combine section 20 is disposed in a first holder 31 of the collimator section 30. Specifically, the combine section 20 is attached to a spacer section 25 fixed to the inner wall of the first holder 31 having a cylindrical shape. The spacer section 25 includes two contact surfaces 25a with which the combine section 20 is brought into contact. The spacer section 25 is fixed to the first holder 31 using, for example, an adhesive or YAG welding. The combine section 20 is fixed to the contact surfaces 25a of the spacer section 25 using, for example, an adhesive.

The collimator section 30 is connected to the housing section 12 and holds the combine section 20. Specifically, the collimator section 30 includes the spacer section 25, the first holder (first collimator section) 31, a second holder (second collimator section) 32, a light focusing lens (light focusing section) 33, and an optical fiber 3. The first holder 31 has a cylindrical shape. The combine section 20 is fixed to the inner wall of the first holder 31 through the spacer section 25 as described above and, furthermore, the light focusing lens 33 is directly fixed to the inner wall of the first holder 31. As a material for the first holder 31, for example, stainless steel can be used. The first holder 31 is fixed to the housing section 12 through YAG welding.

The light focusing lens 33 focuses the light waves combined by the polarization combine element 22 and introduces the light waves into the optical fiber 3. The light focusing lens 33 is fixed to the first holder 31 by carrying out, for example, YAG welding on a frame portion provided on the outer circumference of the light focusing lens 33 and the first holder 31.

A ferrule 35 and a fiber holder 36 are provided at the front end portion of the optical fiber 3. The front end portion of the optical fiber 3 is inserted into a hole portion provided in the ferrule 35. The ferrule 35 is held by the fiber holder 36. As a material for the ferrule 35, for example, zirconia can be used. In addition, as a material for the fiber holder 36, for example, stainless steel can be used.

The second holder 32 has a cylindrical shape. As a material for the second holder 32, for example, stainless steel can be used. Inside the second holder 32, the fiber holder 36 of the optical fiber 3 is disposed. The fiber holder 36 is fixed to the second holder 32 through, for example, YAG welding. The first holder 31 and the second holder 32 are joined together through, for example, YAG welding.

Here, the order of combining the combine section 20 and the collimator section 30 to the housing section 12 will be described in detail. First, the combine section 20 and the light focusing lens 33 are attached to the inside of the first holder 31. Next, the first holder 31 is brought into contact with the end portion of the housing section 12 on the light wave emission side and the position thereof is determined with respect to the housing section 12 so that the two light waves emitted from the substrate 11 are emitted from the center of the light focusing lens 33 through the combine section 20. In addition, the first holder 31 is fixed to the housing section 12 through, for example, YAG welding.

Next, the front end portion of the optical fiber 3 inserted into the second holder 32 is brought into contact with the first holder 31 and the position of the optical fiber 3 is adjusted so that the front end portion of the optical fiber 3 is located at the focal position at which the light waves emitted from the light focusing lens 33 are coupled to the optical fiber 3 maximally. In this state, the fiber holder 36 and the second holder 32 are bonded to each other through, for example, YAG welding. Finally, the second holder 32 and the first holder 31 are joined together through, for example, YAG welding.

The present embodiment is configured as described above, the substrate 11 is provided in the storage space X of the housing section 12, and the combine section 20 is disposed outside of the storage space X. Therefore, it becomes possible to attach the combine section 20 to the housing section 12 after the box portion 12a and the lid portion 12b, which configure the housing section 12, are joined together. Therefore, even in a case in which the box portion 12a and the lid portion 12b are joined together by a method in which heat generated from seam welding is used, there is no case in which the position misalignment of the combine section 20 is caused due to the influence of heat generated during the joining of the box portion 12a and the lid portion 12b by attachment of the combine section 20 to the housing section 12 after the box portion 12a and the lid portion 12b are joined together. In addition, since the combine section 20 is provided outside of the storage space X of the housing section 12 in this configuration, it is possible to decrease the size of the housing section 12 as much as the space of the combine section 20 and the space required for attaching the combine section 20. Therefore, an increase in the length of the housing section 12 is prevented and, even in a case in which heat is added to the housing section 12, the warping of the housing section can be suppressed. As described above, in the optical modulator 1, there are no cases in which the characteristics deteriorate even when the temperature changes.

In addition, in the optical modulator 1, it becomes possible to adjacently dispose the combine section 20 and the collimator section 30 along the same axis outside the storage space X of the housing section 12. Therefore, compared with a case in which the combine section 20 is disposed in the storage space X of the housing section 12 and the collimator section 30 is disposed outside the storage space X of the housing section 12, in the optical modulator 1 according to the present embodiment, even in a case in which the temperature changes, it is possible to suppress the positions of the combine section 20 and the collimator section 30 being misaligned and to prevent the degradation of the characteristics.

The combine section 20 includes the polarization rotation element 21 and the polarization combine element 22. The polarization rotation element 21 and the polarization combine element 22 are disposed outside of the storage space X of the housing section 12. As described above, when the polarization rotation element 21 and the polarization combine element 22 are disposed outside of the storage space X of the housing section 12, it becomes possible to further decrease the size of the housing section 12. In addition, since it becomes possible to further decrease the size of the housing section 12, even in a case in which the temperature changes, the warping of the housing section 12 is further suppressed and the degradation of the characteristics can be suppressed. Furthermore, in the case of the configuration of the related art in which the polarization rotation element 21 and the polarization combine element 22 are provided in the housing section, the thickness of the bottom part of the housing section 12 outside of the surface to which the substrate 11 is fixed becomes thin in order to ensure the space for disposing the polarization rotation element 21 and the polarization combine element 22. As a result, in the portion of the bottom part having a thin thickness (thin portion) in the configuration of the related art, the influence of the temperature change becomes significant; however, in the present embodiment, the influence of the temperature change is also suppressed.

The collimator section 30 includes the first holder 31 to which the combine section 20 and the light focusing lens 33 are fixed and the second holder 32 to which the optical fiber 3 is fixed. Therefore, it becomes possible to more accurately introduce the light waves focused by the light focusing lens 33 into the optical fiber 3 by adjusting the positional relationship between the first holder 31 and the second holder 32.

In the spacer section 25 to which the combine section 20 is attached, the two contact surfaces 25a with which the combine section 20 is brought into contact are provided. Therefore, in a case in which the combine section 20 is fixed to the contact surfaces 25a of the spacer section 25 through adhesion, it becomes possible to ensure a wide adhesion area and it is possible to increase the adhesion strength. Therefore, it is possible to prevent the position misalignment and dropping of the combine section 20.

For example, the housing section 12, the first holder 31, and the second holder 32 are formed of the same metallic material such as stainless steel and are joined together through YAG welding. In this case, since the housing section 12, the first holder 31, and the second holder 32 are formed of the same material, the linear expansion coefficients thereof become identical to each other and it is possible to produce the optical modulator 1 which is hard to be affected by thermal strain caused by a temperature change.

Figure 4:
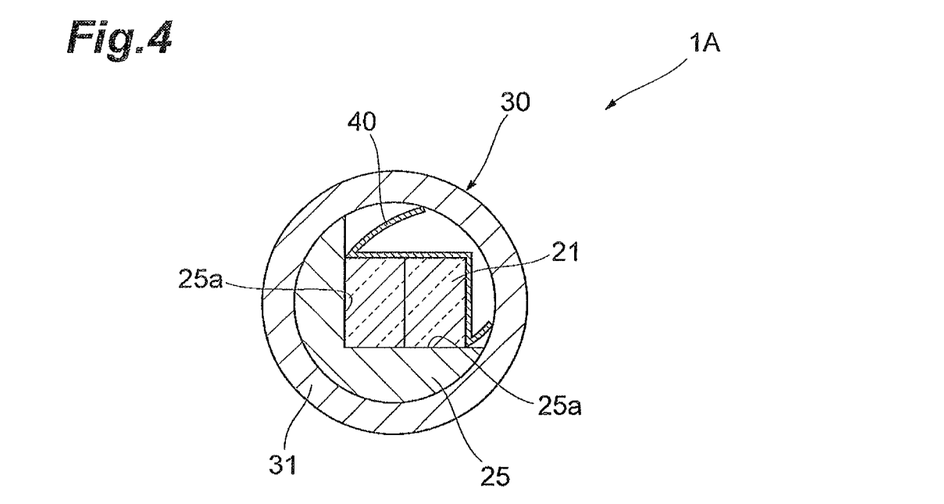
FIG. 4 is a cross-sectional view illustrating a first modification example of a method for fixing a combine section.

Next, modification examples of the fixing of the combine section 20 to the spacer section 25 will be described. First, a first modification example will be described. As illustrated in FIG. 4, in an optical modulator 1A of the first modification example, similar to the embodiment described above, the combine section 20 is brought into contact with the two contact surfaces 25a of the spacer section 25 and is fixed to the contact surfaces using an adhesive. Furthermore, a leaf spring (restraining member) 40 that presses the combine section 20 toward the contact surfaces 25a and restrains the position misalignment of the combine section 20 with respect to the contact surfaces 25a is provided in the first holder 31. In this case, the combine section 20 can be easily and more reliably fixed to the spacer section 25.

Figure 5:
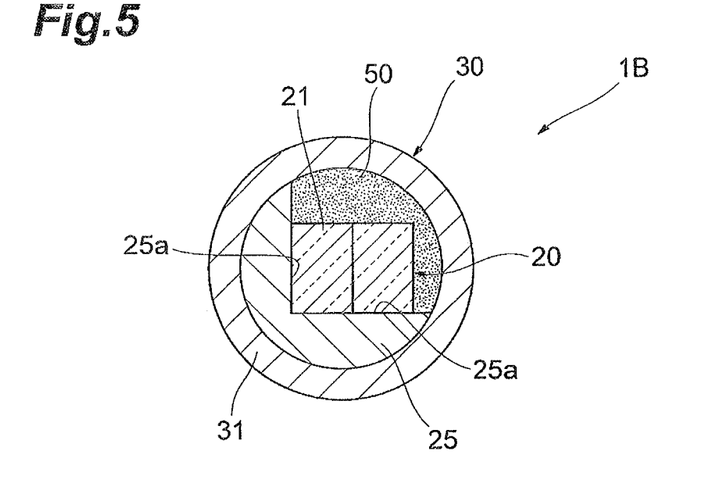
FIG. 5 is a cross-sectional view illustrating a second modification example of the method for fixing the combine section.

Next, a second modification example will be described. As illustrated in FIG. 5, in an optical modulator 1B of the second modification example, similar to the embodiment described above, the combine section 20 is brought into contact with the two contact surfaces 25a of the spacer section 25 and is fixed to the contact surfaces using an adhesive. Furthermore, in the first holder 31, a gap between the spacer section 25 and the first holder 31 is filled with a filler (restraining member) 50 such as an optical sealing material. When the gap is filed with the filler 50, the position misalignment of the combine section 20 with respect to the contact surfaces 25a is restrained. As described above, the combine section 20 can be easily and more reliably fixed to the spacer section 25.

Thus far, an embodiment and a variety of modification examples of the present invention have been described, but the present invention is not limited to the embodiment and the modification examples. For example, for the substrate 11 in the optical waveguide element used in the modulation unit 10, it is also possible to use a semiconductor material having an electroabsorption effect or an organic material having an electro-optic effect. The combine section 20 includes the polarization rotation element 21 and the polarization combine element 22, but it is also possible to combine the polarization rotation element 21 into the substrate 11 or provide the polarization rotation element in the housing section 12. In this case, it is possible to dispose the polarization rotation element 21 at an appropriate position such as the substrate 11 and the degree of freedom for design improves.

Generally, the lens section 13 is fixed to the bottom surface of the storage space X of the housing section 12, but it is also possible to fix the lens section 13 to the emission end section of the substrate 11. In this case, it is possible to further decrease the thin portion in the bottom part of the housing so as to decrease the size of the optical modulator and to suppress the influence of a temperature change.

As the polarization combine element 22 in the combine section 20, a polarization beam splitter (PBS) may be used. In this case, like the embodiment described above, it is possible to decrease the size of the polarization combine element 22 in the optical axis direction of light waves (to shorten the length of the element) compared with a case in which yttrium•vanadate crystals and the like are used as the polarization combine element 22. Therefore, it is possible to further decrease the size of the optical modulator.

The combine section 20 has been described as a DP-QPSK modulator having a polarization multiplexing function obtained by using the polarization rotation element 21 and the polarization combine element 22; however, in the case of a modulator employing a modulation method in which a polarization multiplexing function is not required, it is also possible to use other light combine elements in place of the polarization combine element 22. In this case, the polarization rotation element 21 is not required.

The position misalignment of the combine section 20 is prevented using the leaf spring 40 or the filler 50, but it is also possible to restrain the position misalignment of the combine section 20 using other restraining members.

The light focusing lens 33 is fixed to the first holder 31, but it is also possible to fix the light focusing lens to the second holder 32.

The above-described materials for the respective sections and the joining methods such as YAG welding are simple examples and the present invention is not limited to those exemplified. In addition, the optical modulator in which two light waves are emitted from the substrate 11 has been described, but it is also possible to use an optical modulator in which three or more light waves are emitted.

INDUSTRIAL APPLICABILITY

According to the aspect of the present invention, there are no cases in which the characteristics deteriorate even when the temperature changes.

REFERENCE SIGNS LIST 1 optical modulator (optical element)
2, 3 optical fiber
11 substrate (optical waveguide element)
12 housing section
12a box portion (member)
12b lid portion (member)
20 combine section
21 polarization rotation element
22 polarization combine element
25 spacer section
30 collimator section
31 first holder (first collimator section)
32 second holder (second collimator section)
33 light focusing lens (light focusing section)
40 leaf spring (restraining member)
50 filler (restraining member)
X storage space

The invention claimed is:

1. An optical element combining light waves using a spatial optical system, comprising:
  a housing section having a storage space and formed by joining two or more members together;
  an optical waveguide element provided in the storage space and emitting at least two light waves;
  a combine section provided outside the storage space and combining the light waves emitted from the optical waveguide element outside the housing section, using a spatial optical system; and
  a collimator section connected to the housing section, holding the combine section, and including a light focusing section configured to focus a light wave combined by the combine section and an optical fiber to which the light wave focused by the light focusing section is introduced,
  wherein the collimator section further includes a spacer section having at least two contact surfaces with which the combine section is brought into contact; and the combine section is fixed to the contact surfaces of the spacer section.

2. The optical element according to claim 1, wherein the combine section includes
  a polarization rotation element rotating a polarization plane of at least one of the light waves emitted from the optical waveguide element, and
  a polarization combine element polarization-combining a light wave having a polarization plane not rotated by the polarization rotation element and a light wave having a polarization plane rotated by the polarization rotation element, or light waves having polarization planes rotated by the polarization rotation element, from among the light waves emitted from the optical waveguide element.

3. The optical element according to claim 1, further comprising:
  a polarization rotation element rotating a polarization plane of at least one of the light waves emitted from the optical waveguide element,
  wherein the combine section polarization-combines a light wave having a polarization plane not rotated by the polarization rotation element and a light wave having a polarization plane rotated by the polarization rotation element, or light waves having polarization planes rotated by the polarization rotation element, from among the light waves emitted from the optical waveguide element.

4. The optical element according to claim 1, wherein the collimator section further includes a restraining member restraining a position misalignment of the combine section with respect to the contact surfaces of the spacer section.

5. The optical element according to claim 4, wherein the restraining member is a leaf spring or a filler.

6. The optical element according to claim 1, wherein the collimator section includes
  a first collimator section to which the combine section and the light focusing section are fixed, and
  a second collimator section to which the optical fiber is fixed.

* * * * *